United States Patent [19]

Distler et al.

[11] Patent Number: 4,828,787
[45] Date of Patent: May 9, 1989

[54] APPARATUS FOR SIMULATION OF THE OPERATION OF A PRESSURIZED WATER NUCLEAR REACTOR

[75] Inventors: Klaus Distler, Biblis; Rolf Enders, Worms; Dieter Göhlich, Biblis, all of Fed. Rep. of Germany

[73] Assignee: Rheinisch-Westfalisches Elektrizitatswerk Akteingesellschaft, Essen, Fed. Rep. of Germany

[21] Appl. No.: 57,794

[22] Filed: Jun. 3, 1987

[30] Foreign Application Priority Data

Jul. 17, 1986 [DE] Fed. Rep. of Germany ....... 3624119

[51] Int. Cl.[4] .......................... G21C 17/00; G09B 9/00
[52] U.S. Cl. ..................................... 376/245; 376/298; 376/402; 434/218
[58] Field of Search ................ 434/218; 376/245, 282, 376/283, 298, 307, 402

[56] References Cited

U.S. PATENT DOCUMENTS 4,187,146  2/1980  Shen et al. .

4,545,766  10/1985  Schoessow ......................... 434/218

*Primary Examiner*—Charles T. Jordan
*Assistant Examiner*—Richard Klein
*Attorney, Agent, or Firm*—Herbert Dubno

[57] ABSTRACT

The apparatus for simulation of the operation of a pressurized water reactor comprises a reactor vessel with a heater, a steam generating vessel divided into a primary portion and a secondary portion. The reactor vessel and the primary portion of the steam generating vessel are connected in a primary feed loop equipped with a coolant pump, while the secondary portion of the steam generating vessel and the condenser unit are joined together in a secondary feed loop provided with a feed pump. With such an apparatus a steam generating vessel heating pipe break or fracture can be simulated when the reactor vessel and a primary part of an additional steam generating unit are joined in another primary feed loop parallel to the primary feed loop having the cooling pump and a secondary part of the additional steam generating unit is connected with the aid of at least two branch pipes to the secondary feed loop.

5 Claims, 1 Drawing Sheet

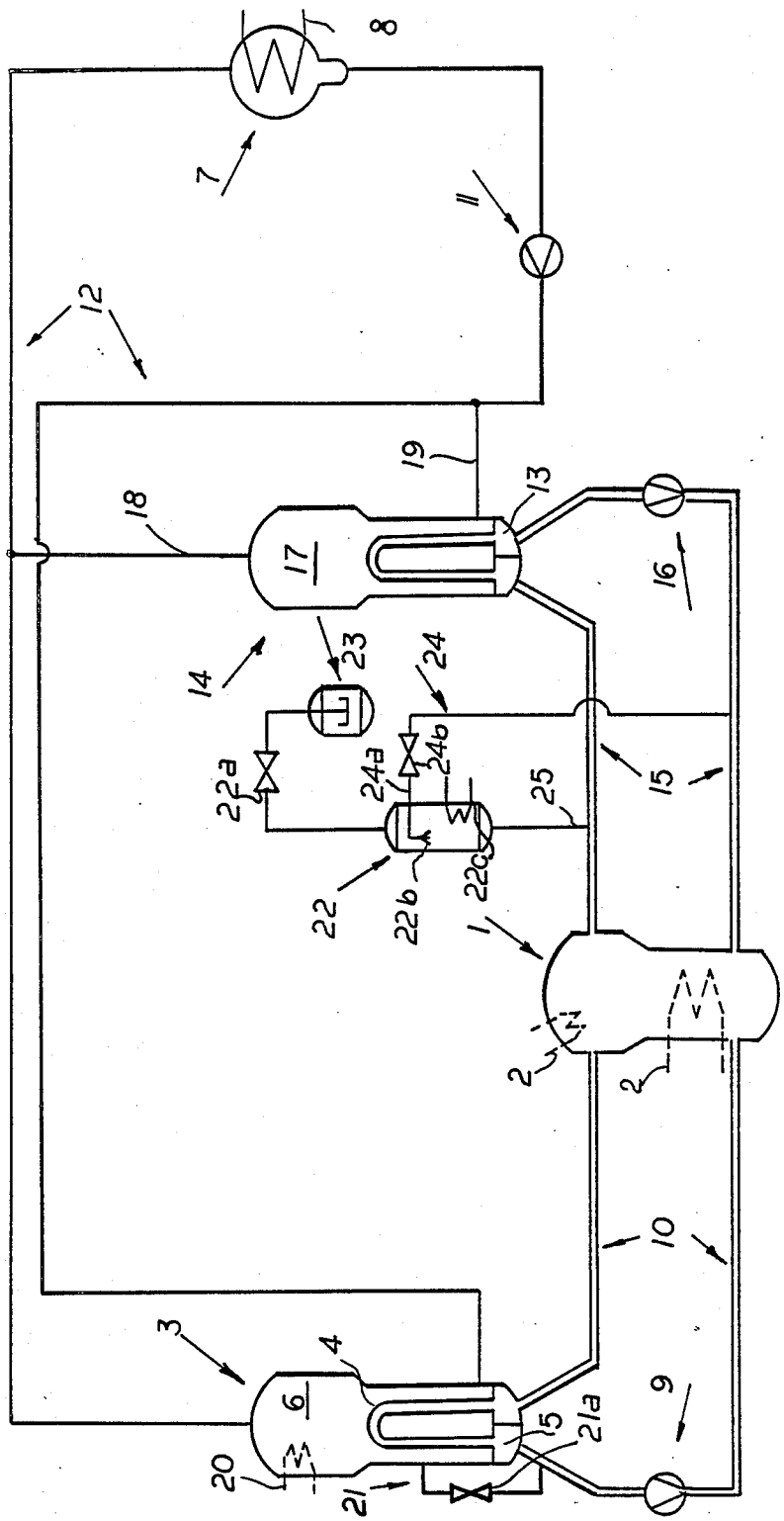

APPARATUS FOR SIMULATION OF THE OPERATION OF A PRESSURIZED WATER NUCLEAR REACTOR

FIELD OF THE INVENTION

Our present invention relates to an apparatus for simulation of the operation of a nuclear reactor and, more particularly, of a pressurized water nuclear reactor.

BACKGROUND OF THE INVENTION

An apparatus is known for simulation of the operation of a pressurized water reactor comprising a reactor vessel having a heater, a steam generating vessel divided by advantageously a divider into a primary portion and a secondary portion.

It can advantageously include a pressurized vessel, a relief vessel, a spray line, and a condenser unit provided with a cooling device.

The reactor vessel and the primary portion of the steam generating vessel are connected in a primary feed loop equipped with a coolant pump and the secondary portion of the steam generating vessel and the condenser unit are connected in a secondary feed loop provided with a feed pump.

In this apparatus, which has not, to our knowledge, been described in detail in print, the reactor vessel is connected only in the primary feed loop with the steam generating vessel. This has the consequence that the "steam generating vessel heating pipe break" damage case can not be reproduced. This known apparatus is thus more suitable for demonstration purposes than for true educational purposes.

OBJECTS OF THE INVENTION

It is an object of our invention to provide an improved apparatus for simulation of the operation of a pressurized water reactor.

It is also an object of our invention to provide an improved apparatus for simulation of the operation of a pressurized water reactor which can be used to simulate the problems occurring in the case of a steam generating vessel heating pipe break or fracture.

SUMMARY OF THE INVENTION

These objects and others which will become more readily apparent hereinafter are attained in accordance with our invention in an apparatus for simulation of the operation of a pressurized water reactor comprising a reactor vessel having a heater, a steam generating vessel divided by advantageously a divider into a primary portion and a secondary portion, and also advantageously usually a pressurized vessel, a relief vessel and a condenser unit provided with a cooling device.

The reactor vessel and the primary portion of the steam generating vessel are connected in a primary feed loop equipped with a coolant pump and the secondary portion of the steam generating vessel and the condenser unit are connected in a secondary feed loop provided with a feed pump.

According to our invention the reactor vessel and a primary part of an additional steam generating unit are combined in another primary feed loop parallel to the primary feed loop having the coolant pump. A secondary part of the additional steam generating unit is connected with the aid of at least two branch pipes to the secondary feed loop.

Our invention recognizes for simulation of the steam generating vessel heating pipe breaking or fracture an additional steam generating unit is required to cool the regulated primary feed loop. Actually, the defective steam generating vessel must be disconnected and it can no longer be made available for the start up process or for operation.

There are several possible embodiments of our invention. Only two branch pipes are necessary.

Advantageously the reactor vessel, the steam generating vessel, the piping of the primary feed loop, the compression vessel and the relief vessel can be made of glass. In this way all processes, particularly the two phase processes, can be clearly observed.

According to another feature of our invention a heating element is located exclusively in the secondary portion of the steam generating vessel.

The simulation can proceed with the heat supplied and the cooling of the steam chamber is controllable.

Moreover a connector pipe which is closable can be installed between the primary portion and the secondary portion of the steam generating vessel to simulate a steam generating vessel heating pipe break or fracture.

Further, according to the invention the supply pump is associated jointly with the secondary portion of the steam generating vessel and the secondary part of the steam generating unit. In this way unnecessary structure can be avoided.

BRIEF DESCRIPTION OF THE DRAWING

The above and other objects, features and advantages of our invention will become more readily apparent from the following description, reference being made to the accompanying drawing in which the sole FIGURE is a schematic diagram of an apparatus for simulation of the operation of a pressurized water reactor according to our invention.

SPECIFIC DESCRIPTION

The apparatus shown in the drawing simulates the operation of a pressurized water reactor for demonstration and educational purposes.

The apparatus basically comprises a reactor vessel 1 (representing a pressurized water nuclear reactor) with a heater 2 (representing the nuclear reactor core) having a plurality of heating elements, a steam generating vessel 3 (heated by the primary circulation through the reactor) which is divided by a divider 4 into a primary portion 5 and a secondary portion 6, a pressurized vessel 22 which is connected by a connecting pipes 24 and 25 with the primary feed loop 10, a relief vessel 23 and a condenser unit 7 provided with a cooling means 8.

The pressurized vessel 22 has a valve 22a connecting it with the expansion vessel 23, a spray pipe 24a provided with a valve 24b and a spray nozzle 22b, and a cooling coil 22c.

The reactor vessel 1 and the primary portion of the steam generating vessel 3 are connected in a primary feed loop 10 and the secondary portion 6 of the steam generating vessel 3 and the condenser unit 7 are connected in a secondary feed loop 12 provided with a feed pump 11. As far as this goes the apparatus corresponds to those known.

The reactor vessel 1 and a primary part 13 of an additional steam generating unit 14 are now connected with its own coolant pump 16 in another primary feed loop 15 parallel to the first primary feed loop 10.

The secondary part 17 of this additional steam generating unit 14 is connected to the secondary feed loop 12 with the help of the branch pipes 18 and 19 in such a way that the feed pump 11 is associated jointly with the secondary portion 6 of the steam generating vessel 3 and the secondary part 17 of the steam generating unit 14.

A heating element 20 is located and connected to simulate heating pipe breaks or fractures in the secondary portion 6 of the first steam generating vessel 3.

A connector pipe 21, which a valve 21a connects the primary and secondary portions of the steam generating vessel 3 also to simulate a pipe break or fracture. Such a heating element is not provided in the secondary part 17 of the additional steam generating unit 14 which otherwise corresponds to the first steam generating vessel 3 in structure.

Of course, the one primary feed loop 10, the other primary feed loop 15 and the combined secondary feed loop 12 have the standard valves required for simulation of the various failure and operating conditions. However these standard valves have not been illustrated in the drawing.

To simulate the "steam generating vessel heating pipe break" damage case a heating pipe break is simulated by opening the connector pipe 21 connecting the the one primary feed loop 10 with the secondary feed loop 12, stopping the first steam generating vessel 3 and setting the additional steam generating unit 14 for the start up process to cool the regulated primary feed loop.

We claim:

1. In an apparatus for simulation of the operation of a pressurized water reactor comprising a reactor vessel having a heater, a steam generating vessel divided into a primary portion and a secondary portion, said reactor vessel and said primary portion of said steam generating vessel being connected in a primary feed loop equipped with a coolant pump and said secondary portion of said steam generating vessel and a condenser unit being connected in a secondary feed loop provided with a feed pump, the improvement wherein said reactor vessel and a primary part of an additional steam generating unit are combined in another primary feed loop parallel to said primary feed loop having said coolant pump, a secondary part of said additional steam generating unit is connected with the aid of at least two branch pipes to said secondary loop, a connnector pipe with a valve for closing the pipe is installed between said primary feed loop and said secondary portion, and a pressure regulating system comprising a pressurized vessel communicating both with an expansion vessel and a spray pipe is connected into the primary feed loop.

2. The improvement according to claim 1 wherein said reactor vessel, said steam generating vessel, said additional steam generating unit and the piping of said primary feed loop are composed of glass.

3. The improvement according to claim 1 wherein a heating element is located in said secondary portion of said steam generating vessel and said connector pipe is installed between said primary portion and said secondary portion of said steam generating vessel.

4. An apparatus for simulation of the operation of a pressurized water reactor, comprising:
    a reactor vessel having a heater;
    a steam generating vessel divided by a divider into a primary portion and a secondary portion;
    a condenser unit provided with a cooling device;
    a coolant pump connected in a primary feed loop in which said reactor vessel and said primary portion of said steam generating vessel are connected;
    a feed pump connected in a secondary feed loop in which said secondary portion of said steam generating vessel and said condenser unit are connected;
    an additional steam generating unit, said reactor vessel and a primary part of said additional stem generating unit being combined in another primary feed loop parallel to said primary feed loop having said coolant pump and a secondary part of said additional steam generating unit being connected with the aid of two branch pipes to said secondary feed loop, said feed pump being associated jointly with said secondary portion of said steam generating vessel and said secondary part of said additional steam generating unit;
    a relief vessel;
    a spray pipe provided with spray nozzles;
    a pressurized vessel installed within said primary feed loop and connected to said relief vessel and spray pipe;
    a heating element located in said secondary portion of said steam generating vessel; and
    a connector pipe, having a valve for closing said pipe, installed between said primary portion and said secondary portion of said steam generating vessel.

5. An apparatus according to claim 4 wherein said reactor vessel, said steam generating vessel, said additional steam generating vessel and the piping of said primary feed loop as well as said pressurized vessel and said relief vessel are composed of glass.

* * * * *

REEXAMINATION CERTIFICATE (1547th)
United States Patent [19]
Distler et al.

[11] B1 4,828,787

[45] Certificate Issued Sep. 3, 1991

[54] APPARATUS FOR SIMULATION OF THE OPERATION OF A PRESSURIZED WATER NUCLEAR REACTOR

[75] Inventors: Klaus Distler, Biblis; Rolf Enders, Worms; Dieter Göhlich, Biblis, all of Fed. Rep. of Germany

[73] Assignee: Rheinisch-Westfalisches Elektrizitatswerk Aktiengesellschaft

Reexamination Request:
No. 90/001,897, Nov. 20, 1989

Reexamination Certificate for:
Patent No.: 4,828,787
Issued: May 9, 1989
Appl. No.: 57,794
Filed: Jun. 3, 1987

[30] Foreign Application Priority Data
Jul. 17, 1986 [DE] Fed. Rep. of Germany ....... 3624119

[51] Int. Cl.$^5$ .............. G21C 17/00; G09B 9/00
[52] U.S. Cl. .................. 376/245; 376/298; 376/402; 434/218
[58] Field of Search ......... 434/218; 376/245, 282, 376/283, 298, 307, 402

[56] References Cited
U.S. PATENT DOCUMENTS

| | | | |
|---|---|---|---|
| 2,920,025 | 1/1960 | Anderson | 204/193.2 |
| 3,060,110 | 10/1962 | Wainrib | 204/193.2 |
| 3,114,414 | 12/1963 | Judd | 165/31 |
| 3,211,621 | 10/1965 | Creagan | 376/298 |
| 3,245,463 | 4/1966 | Benedict et al. | 165/105 |
| 3,417,815 | 12/1968 | Van Den Honert | 165/107 |
| 4,124,067 | 11/1978 | Bonnet et al. | 165/107 D |
| 4,470,948 | 9/1984 | Aanstad et al. | 376/216 |
| 4,545,766 | 10/1985 | Schoessow | 434/218 |

*Primary Examiner*—Daniel D. Wasil

[57] ABSTRACT

The apparatus for simulation of the operation of a pressurized water reactor comprises a reactor vessel with a heater, a steam generating vessel divided into a primary portion and a secondary portion. The reactor vessel and the primary portion of the steam generating vessel are connected in a primary feed loop equipped with a coolant pump, while the secondary portion of the steam generating vessel and the condenser unit are joined together in a secondary feed loop provided with a feed pump. With such an apparatus a steam generating vessel heating pipe break or fracture can be simulated when the reactor vessel and a primary part of an additional steam generating unit are joined in another primary feed loop parallel to the primary feed loop having the cooling pump and a secondary part of the additional steam generating unit is connected with the aid of at least two branch pipes to the secondary feed loop.

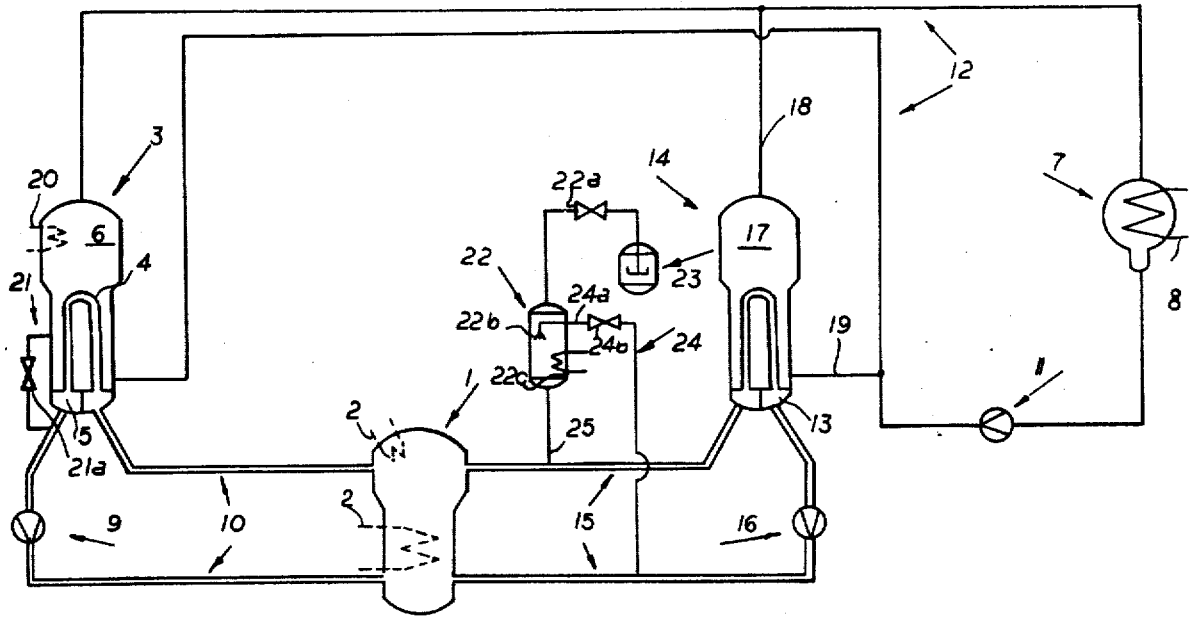

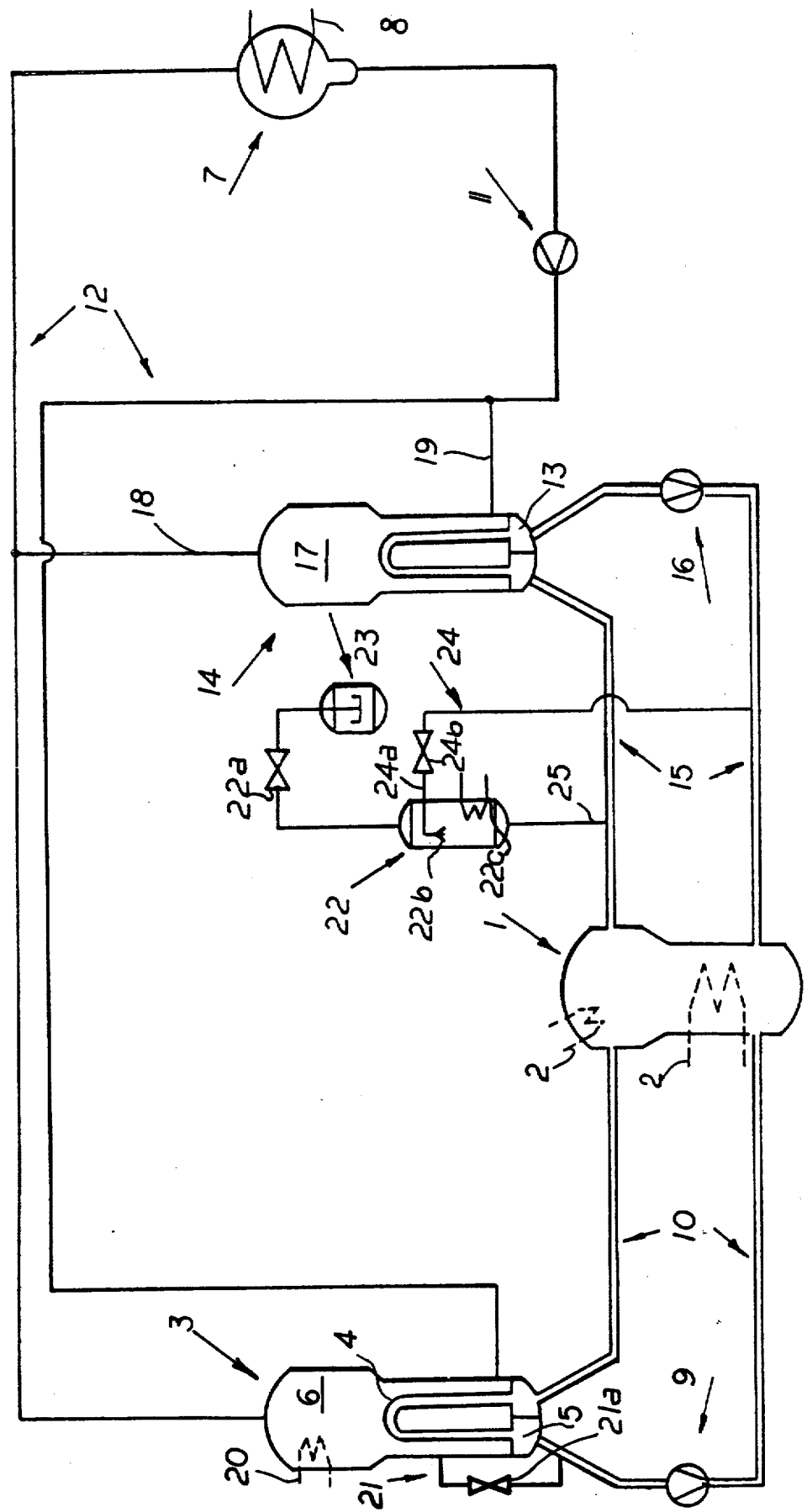

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1-5 are cancelled.

* * * * *